3,205,266
HYDROGENATION PROCESS
Jack Kwiatek and Irving L. Mador, Cincinnati, Ohio, assignors to National Distillers and Chemical Corporation, New York, N.Y., a corporation of Virginia
No Drawing. Filed May 11, 1961, Ser. No. 109,251
6 Claims. (Cl. 260—590)

The present invention relates to a novel process for hydrogenation of certain aromatic-containing compounds containing an aliphatic ketonic chain and a vinyl group conjugated with a carbonyl group whereby to saturate the vinyl group.

The invention is based on the discovery that such compounds can be satisfactorily hydrogenated by reaction thereof in the presence of hydrogen with an aqueous solution containing cyanide anions and ions of a cobalt group metal (i.e., cobalt, rhodium and iridium) that is basic and that, preferably, has a pH of from about 7 to about 13, provided that the cobalt group metal ion is maintained in excess of a mole to mole ratio with the substrate to be reduced. Otherwise, such as by use of at least a mole to mole ratio of the cobalt group metal ion to the substrate, the stated compounds are either not hydrogenated or are difficult to saturate with such a catalyst system.

As embodiments, the process can be carried out in batch-wise manner using such relative amounts of the substrate to catalyst or in a manner whereby a relatively small amount of the substrate is reacted with the catalyst and, following reduction of all or a portion of the substrate, adding substrate in increments while at all times maintaining the amount of unreacted substrate in contact with the catalyst at substantially less than a mole to mole ratio with the catalyst. In preferred embodiments, the catalyst to substrate ratio is maintained at from about 0.3–0.6 mole of the substrate per mole of the catalyst.

Thus, in a more specific aspect, the process embodied herein relates to hydrogenation of compounds of the following formula:

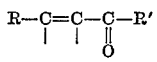

wherein R can be hydrogen, alkyl, aryl, alkoyl or aroyl, R' can be alkyl or aryl and in which at least R or R' is aryl or aroyl. Specific compounds within the scope of such a formula include trans - 4 - phenyl-3-butenone-2, 1,4 - diphenyl - 2 - buten - dione - 1,4, 1-phenyl-4-methyl-2 - buten - dione - 1,4, 1,3 - diphenyl - 2 - propenone - 1, 1-phenyl-2-propenone-1, 1-phenyl-2-petenone-1, and the like.

For carrying out the reaction embodied herein, the cobalt group metal ions are provided in the reaction mixture by use of a water-soluble salt of such a metal. For that purpose, such salts of organic or inorganic acids may be used, for example, salts such as cobalt nitrate, cobalt acetate, cobalt sulfate, cobalt carbonate, cobalt chloride, etc. Regarding the cyanide anions, they are provided in the reaction mixture preferably by use of water-soluble alkali metal cyanides, such as sodium cyanide, potassium cyanide, etc., and mixtures of cobalt cyanide with potassium cyanide and/or sodium cyanide.

Although the ratio of cyanide anions to cobalt group metal ions present in the reaction mixture may be varied, the invention is generally carried out using a ratio of from about two to about ten cyanide anions per ion of the cobalt group metal and, more specifically, from about three to about six cyanide anions per ion of such a metal, such ratios being obtained by appropriate use of the required amounts of the substance or substances employed to provide the cyanide anions and cobalt group metal ions.

The process embodied herein is carried out with the stated metal ions and cyanide anions being in aqueous solution. In certain instances, it may be desirable to improve contact between the substrate and the stated metal ions and cyanide anions by dissolving the substrate in a suitable solvent. For such a purpose, substances such as hexane, dioxane, methanol, n-butanol, isopropanol, tetrahydrofuran, and the like may be used and which are otherwise inert with respect to the reactants employed and the products of the reaction embodied herein.

The reaction embodied herein may be carried out under rather mild conditions of hydrogen pressure, such as at one atmosphere, and temperatures, such as room temperature. However, if desired, higher hydrogen pressures can be used and, for example, elevated hydrogen pressures such as up to about 1000 p.s.i.; and, as to temperature, a preferred range is from about 0 to about 125° C., but still higher temperatures can be used if desired.

In order to further describe the invention, the following embodiments are set forth for purposes of illustration and not limitation. For purposes of comparison, and to illustrate the improvements provided by practice of this invention, designated in the following examples as "incremental addition," there are also set forth comparable examples designated "non-incremental addition," but carried out with use of at least a mole to mole ratio of the cobalt group metal catalyst to the substrate.

EXAMPLE 1

*Trans-4-phenyl-3-butenone-2 (incremental addition)*

A solution of potassium cyanide (0.153 mole) in 100 ml. water was added to a solution of cobaltous chloride (0.03 mole) in 100 ml. water with stirring under a hydrogen atmosphere. At room temperature; the potassium cobaltous cyanide formed absorbed 268 ml. hydrogen. To this solution was added a solution of 0.03 mole trans-4-phenyl-3-butenone-2 dissolved in 15 ml. benzene in three equal increments along with 0.03 mole KOH; the mixture was stirred after each addition until hydrogen was no longer absorbed; a total of 414 ml. hydrogen was absorbed. The reaction mixture was extracted with ether and 4-phenyl-2-butanone was obtained. Confirmation was made by infrared spectrum analysis and preparation of its semicarbazone derivative (M.P. 143–5° C., literature M.P. 142° C.).

EXAMPLE 2

*Trans-4-phenyl-3-butenone-2 (non-incremental)*

A solution of potassium cyanide (0.153 mole in 100 ml. water) was added to a stirred suspension of the ketone dissolved in benzene in a solution of cobaltous chloride (0.03 mole) in 125 ml. water under a hydrogen atmosphere. Only 279 ml. hydrogen was absorbed, presumably by the cobaltous cyanide itself.

EXAMPLE 3

*1,4-diphenyl-2-buten-dione-1,4 (incremental addition)*

In a run similar to that of Example 1, the subject ketone (0.027 mole in 50 ml. benzene) was added in five equal increments with 0.06 mole KOH, and 212 ml. of hydrogen were absorbed.

The reaction mixture was extracted with ether, the extract was dried over anhydrous magnesium sulfate and ether was removed by evaporation to yield an oil. Crystallization from benzene-petroleum ether gave 3.7 g. of dibenzoyl ethane, M.P. 142–6° (lit. value, M.P. 145°).

EXAMPLE 4

*1,4-diphenyl-2-buten-dione-1,4 (non-incremental)*

In a run as described in Example 3, but in which 0.05 mole of the ketone was added all at once to the cobaltous cyanide solution, only 20 ml. of hydrogen were absorbed.

While there, above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:
1. A process which comprises contacting in the presence of hydrogen, a compound of the following structure

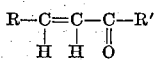

wherein R is selected from the group consisting of hydrogen, alkyl, aryl, alkoyl and aroyl, R' is selected from the group consisting of alkyl and aryl, and at least one of R and R' is selected from the group consisting of aryl and aroyl, with an aqueous solution containing cyanide ions and divalent ions of a metal selected from the group consisting of cobalt, rhodium and iridium, the aqueous solution being at a pH of from about 7 to about 13, said compound being added to said aqueous solution incrementally such that at all times during the reaction the amount of compound is present in a ratio of less than one mole of compound per mole of metal, to saturate the

group in said compound.

2. A process, as defined in claim 1, wherein the reaction is carried out with from about 0.3 to about 0.6 mole of the compound per mole of the metal in the aqueous solution.

3. A process, as defined in claim 1, wherein the aqueous solution contains from about two to about ten cyanide anions per ion of the metal.

4. A process, as defined in claim 1, wherein the reaction is carried out at an elevated hydrogen pressure up to about 1000 p.s.i. and a temperature of from about 0 to about 125° C.

5. A process, as defined in claim 1, wherein the compound is trans-4-phenyl-3-butenone-2.

6. A process, as defined in claim 1, wherein the compound is 1,4-diphenyl-2-buten-dione-1,4.

References Cited by the Examiner

UNITED STATES PATENTS

| 1,263,796 | 4/18 | Nomura | 260—590 |
| 2,381,210 | 8/45 | Cotton | 260—590 |

FOREIGN PATENTS

| 828,244 | 1/52 | Germany. |
| 953,171 | 11/56 | Germany. |

OTHER REFERENCES

Iguchi, Masaakira: Journal of the Chemical Society of Japan, vol. 63 (1942), pages 1752–1754.

Eley et al.: "Advances in Catalysis," vol. XI (1959), pages 318–321.

Winfield: Revs. Pure Appl. Chem. (Australia), vol. 5 (1955), pp. 217–245.

King et al.: J. Am. Chem. Soc., vol. 80 (1958), pp. 2060–2065.

Mills et al.: Journal of Physical Chemistry, vol. 63 (1959), pp. 403–410.

Dilthey et al.: Journal Prakt. Chem., vol. 159 (1942, pp. 278–279.

LORRAINE A. WEINBERGER, *Primary Examiner.*

CHARLES B. PARKER, LEON ZITVER, *Examiners.*